April 18, 1933.　　　　　J. BERGE　　　　1,904,263
NUT AND WASHER ASSEMBLY
Filed July 13, 1931
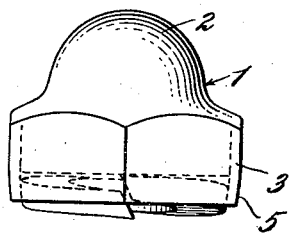
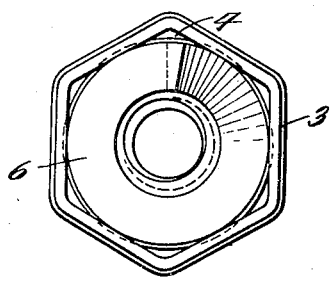
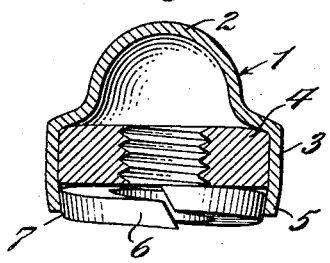
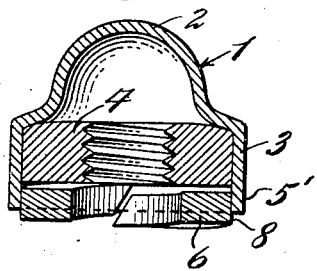

Patented Apr. 18, 1933

1,904,263

UNITED STATES PATENT OFFICE

JOSEPH BERGE, OF MONTCLAIR, NEW JERSEY, ASSIGNOR TO THE NATIONAL LOCK WASHER COMPANY, OF NEWARK, NEW JERSEY, A CORPORATION OF NEW JERSEY

NUT AND WASHER ASSEMBLY

Application filed July 13, 1931. Serial No. 550,426.

This invention relates to a novel and improved form of nut and washer assembly, the novel features of which will be best understood from the following description and the annexed drawing, in which I have shown selected embodiments of the invention, and in which:

Fig. 1 is an elevation of an assembly arrangement according to the illustrated embodiment of the invention.

Fig. 2 is a bottom plan view of the assembly shown in Fig. 1.

Fig. 3 is a vertical sectional view through the device appearing in Fig. 1.

Fig. 4 is a view similar to Fig. 3, showing a slightly different embodiment.

There are numerous places where a nut and the bolt end upon which the nut is threaded are covered by what is known as a crown nut, this crown nut being of better appearance and better quality material than that of the nut and bolt. For the sake of convenience, I shall refer to the crown nut as being placed upon a nut which is adapted to be threaded on a bolt, and which I shall refer to as a bolt nut.

The crown nut as illustrated herein is shown at 1 and as being formed with a dome-shaped crown 2 connected to a peripherally extending skirt 3. In the illustrated embodiment, the bolt nut 4 within the crown nut is hexagonal, and therefore the skirt 3 is also hexagonal to conform to the shape of the bolt nut.

The skirt 3 is preferably provided with an extension 5 at its lower edge, and for the sake of convenience it will be considered that the parts are assembled in the position shown in the drawing, with the washer beneath the bolt nut and the crown nut above and surrounding the bolt nut. It should be understood, however, that terms defining this relation in the specification and claims are merely intended to state the relative positions of the parts, and are not intended to be limiting in any way.

Beneath the bolt nut and within the extension 5 of the skirt is disposed a washer 6, here shown of the spring type, adapted to lock a nut and bolt together so as to prevent accidental rotation of one with respect to the other. In Fig. 3, the extension 5 is shown as being bent inwardly towards the common axis of the bolt nut and the washer, and the washer may be provided with a frusto conical outer surface 7.

In operation, it will be seen that the washer 6 is held against accidental removal from the assembly, and that the washer, bolt nut, and crown nut, can be all placed in position on a bolt with a minimum of labor. This makes it possible to have a number of assemblies made according to this invention disposed on a tray where a workman may pick them up one by one and put them in place on bolts as the line passes him, assuming that he is working on an assembly line in a factory. The invention finds particular utility in such a situation, although, of course, it is useful in other situations as well.

The washer 6 may be moved towards and away from the nut 4 to a limited degree as the assembly is tightened on the bolt. Preferably, the pressure exerted by the skirt 3 is sufficient to prevent removal of the washer, but, nevertheless, will permit this slight axial movement of the washer. The assembly is one which can be easily effected by automatic machinery, without substantial expense.

In Fig. 4 is shown an assembly closely similar to what is shown in Fig. 3, except that here the extension 5' of the skirt is not bent inwardly against the washer 6. In this form, the washer is held in place by frictional engagement between the extension 5' and the cylindrical wall 8 of the washer.

While I have shown the invention as embodied in a specific form, it is to be understood that various changes in details may be made without departing from the scope of the invention, and I therefore do not intend to limit myself except by the appended claims.

I claim:

1. In combination, a bolt nut, a crown nut within which said bolt nut is fixed, a washer disposed within the crown nut adjacent said bolt nut, and means on the crown nut engaging said washer and holding it against removal from the crown nut.

2. In combination, a bolt nut, a crown nut within which said bolt nut is fixed, a washer disposed within the crown nut adjacent said bolt nut, and means out of contact with the bottom of said washer and holding it against removal from the crown nut but permitting limited movement of the washer towards and from the bolt nut.

3. In combination, a bolt nut and a spring washer adjacent thereto, and a crown nut having a skirt closely fitting the exterior of the bolt nut and having a portion extending beyond the lower face thereof into engagement with the outer surface of the washer and holding the washer in position adjacent the bolt nut.

4. In combination, a bolt nut, a crown nut within which said bolt nut is fixed, a washer disposed within the crown nut beneath said bolt nut and having a frusto conically shaped outer surface, with the larger diameter thereof adjacent the top of the washer, said crown nut having a skirt closely fitting the exterior of the bolt nut and having a portion extending beyond the lower face thereof into engagement with said outer surface of the washer.

JOSEPH BERGE.